(12) United States Patent
Bauer et al.

(10) Patent No.: US 9,418,243 B2
(45) Date of Patent: Aug. 16, 2016

(54) INVOKING A PRIVATE BROWSING MODE BY SELECTION OF A VISUAL CONTROL ELEMENT WITHIN A BROWSER TAB

(75) Inventors: Bernhard Bauer, Munich (DE); Philippe J. Beaudoin, Montreal (CA); Chris Bentzel, Quincy, MA (US); Steven Chi Truong, Montreal (CA); Manas Tungare, Mountain View, CA (US)

(73) Assignee: Google Inc., Mountain View, CA (US)

( * ) Notice: Subject to any disclaimer, the term of this patent is extended or adjusted under 35 U.S.C. 154(b) by 428 days.

(21) Appl. No.: 13/531,635

(22) Filed: Jun. 25, 2012

(65) Prior Publication Data
US 2015/0254475 A1 Sep. 10, 2015

(51) Int. Cl.
| | |
|---|---|
| *G06F 17/00* | (2006.01) |
| *G06F 21/62* | (2013.01) |
| *G06F 17/22* | (2006.01) |
| *G06F 17/30* | (2006.01) |
| *H04L 29/06* | (2006.01) |

(52) U.S. Cl.
CPC ........ *G06F 21/6263* (2013.01); *G06F 17/2235* (2013.01); *G06F 17/2247* (2013.01); *G06F 17/30899* (2013.01); *H04L 63/0421* (2013.01)

(58) Field of Classification Search
CPC . H04L 67/02; H04L 67/2819; H04L 67/2842; H04L 63/0407; H04L 63/0421; G06F 17/30899; G06F 17/30884; G06F 17/30876; G06F 17/2235; G06F 17/2247
USPC ........ 715/205, 207, 234, 273, 738, 760, 805, 715/821; 726/26; 707/E17.119, E17.112, 707/E17.121; 709/203, 217, 219; 705/51
See application file for complete search history.

(56) References Cited

U.S. PATENT DOCUMENTS

| | | | | |
|---|---|---|---|---|
| 7,526,730 | B1 * | 4/2009 | Cahill | 715/760 |
| 7,707,501 | B2 * | 4/2010 | Patel | 715/728 |
| 7,975,238 | B2 * | 7/2011 | Keohane et al. | 715/812 |
| 8,464,350 | B2 | 6/2013 | Kanevsky et al. | 726/26 |
| 8,499,341 | B2 * | 7/2013 | Celebisoy | 726/5 |
| 8,782,799 | B2 * | 7/2014 | Phillips et al. | 726/26 |
| 8,789,198 | B2 * | 7/2014 | Phillips et al. | 726/26 |
| 8,839,422 | B2 * | 9/2014 | Ghosh et al. | 726/22 |
| 2002/0083134 | A1 * | 6/2002 | Bauer, Jr. | G06F 17/30873 709/204 |
| 2002/0107884 | A1 * | 8/2002 | Banerjee et al. | 707/501.1 |
| 2007/0168877 | A1 * | 7/2007 | Jain et al. | 715/772 |
| 2011/0167492 | A1 * | 7/2011 | Ghosh et al. | 726/23 |
| 2012/0240237 | A1 * | 9/2012 | Kanevsky et al. | 726/26 |
| 2013/0152010 | A1 * | 6/2013 | Weber | G06F 17/30899 715/783 |
| 2013/0167045 | A1 * | 6/2013 | Xu et al. | 715/760 |

OTHER PUBLICATIONS

Aggrawal, G. et al., "An analysis of private browsing modes in modern browsers,", © 2010, in Proc. of 19th Usenix Security Symposium, 15 pages.*

(Continued)

*Primary Examiner* — Cesar Paula
*Assistant Examiner* — James H Blackwell

(57) ABSTRACT

Activating a private browsing mode for a browser can include receiving an electronic document within the browser and detecting an indicator associated with the electronic document using a processor, wherein the indicator is correlated with the private browsing mode of the browser. Responsive to detecting the indicator, the electronic document can be rendered within a view of the browser in which private browsing mode is activated.

17 Claims, 6 Drawing Sheets

(56) References Cited

OTHER PUBLICATIONS

Graham, K. et al.,"TechMatters: Shiny, Happy, Beta Browser? First Impression of Google Chrome," © Fall 2008, LOEX Quarterly, vol. 35, pp. 6-12.*

Scott, Joseph,"Automatic Incognito Mode for Specific Sites in Chrome (referencing Incognito Regex Chrome Extension)," © Feb. 28, 2012, downloaded from https://josephscott.org/archives/2012/02/automatic-incognito-mode-for-specific-sites-in-chrome/, 2 pages.*

Fuyuchi,"Incognito Regex, version 1.1," © Jun. 7, 2011, downloaded from https://chrome.google.com/webstore/detail/incognito-regex/phodabgmalihpnmmlgoplifofcdnjoll, screen dumps of install page showing documentation, 6 pages.*

Cozma, N.,"How to Make Chrome go Incognito for Specific Sites (referencing Ghost Incognito Chrome Extension)," © Nov. 27, 2011, CNET, 2 pages.*

"Open IE's Private Browsing Mode the Easy Way—How-To Geek," [online] HowtoGeek.com, © 2006-2012, [retrieved Apr. 11, 2012] retrieved from the Internet: <http://www.howtogeek.com/howto/windows-vista/open-ies-private-browsing-mode-the-easy-way/>, 3 pgs.

Orgera, S., "Private Browsing—Activating Private Browsing Mode in Your Favorite Browser," [online] About.com Guide, © 2012 [retrieved Apr. 11, 2012] retrieved from the Internet: <browsers.about.com/od/faq/tp/Private-Browsing.htm>, 3 pgs.

"Private Browsing / How to / Firefox Help," [online] Mozilla.org, [retrieved Apr. 11, 2012] retrieved from the Internet: <support.mozilla.org/en-US/kb/Private-Browsing>, 5 pgs.

* cited by examiner

INVOKING A PRIVATE BROWSING MODE BY SELECTION OF A VISUAL CONTROL ELEMENT WITHIN A BROWSER TAB

BACKGROUND

A "browser" generally refers to a computer program that, when executed within a computing system, can request, retrieve, and display electronic documents such as pages over a communication network. Typically, the browser executes within, or as part of, a client computing system and retrieves information from a server computing system. Modern browsers can provide users with an interactive experience through which data, e.g., pages, can be accessed.

Conventional browsers typically maintain a historical record of the various pages that a user visits. This historical record is usually stored locally on the computing system executing the browser. In some cases, the browser can be configured, at the request of a user, not to maintain such a historical record of visited Web sites.

BRIEF SUMMARY

One or more embodiments disclosed within this specification relate to browser technology and, more particularly, to activation of a private browsing mode within a browser.

An embodiment can include a method. The method can include receiving an electronic document within a browser and detecting an indicator associated with the electronic document using a processor, wherein the indicator is correlated with a private browsing mode of the browser. Responsive to detecting the indicator, the electronic document can be rendered within a view of the browser in which private browsing mode is activated.

Another embodiment can include a method. The method can include determining whether a link displayed within an electronic document is associated with an indicator correlated with a private browsing mode of a browser. Responsive to determining that the link is associated with the indicator using a processor, visually distinguishing the link from another link that is not associated with the indicator within the electronic document as rendered within a view by the browser.

Another embodiment can include a system having a processor. The processor can be configured to initiate executable operations including receiving an electronic document within a browser and detecting an indicator associated with the electronic document, wherein the indicator is correlated with a private browsing mode of the browser. Responsive to detecting the indicator, the electronic document can be rendered within a view of the browser in which private browsing mode is activated.

Another embodiment can include a computer program product. The computer program product can include a computer readable storage medium having stored thereon program code that, when executed, configures a processor to perform operations including receiving an electronic document within a browser and detecting an indicator associated with the electronic document, wherein the indicator is correlated with a private browsing mode of the browser. Responsive to detecting the indicator, the electronic document can be rendered within a view of the browser in which private browsing mode is activated.

DETAILED DESCRIPTION

Figure 1:
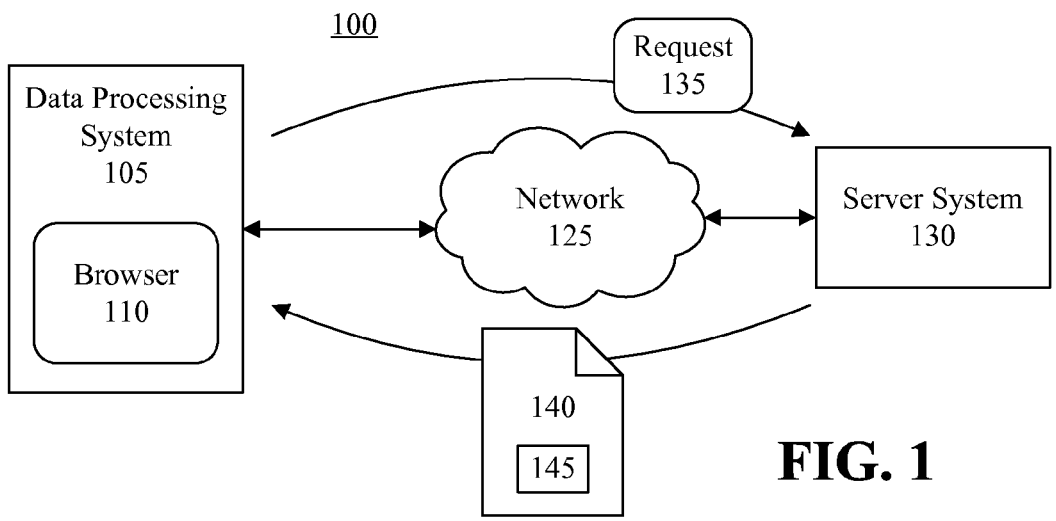
FIG. 1 is a block diagram illustrating a communication system in accordance with one embodiment disclosed within this specification.

While the specification concludes with claims defining features of one or more embodiments that are regarded as novel, it is believed that the embodiment(s) will be better understood from a consideration of the description in conjunction with the drawings. As required, one or more detailed embodiments are disclosed within this specification. It should be appreciated, however, that the embodiment(s) are merely exemplary. Therefore, specific structural and functional details disclosed within this specification are not to be interpreted as limiting, but merely as a basis for the claims and as a representative basis for teaching one skilled in the art to variously employ the embodiment(s) in virtually any appropriately detailed structure. Further, the terms and phrases used within this specification are not intended to be limiting, but rather to provide an understandable description of the embodiments disclosed herein.

One or more embodiments disclosed within this specification relate to browser technology and, more particularly, to activation of a private browsing mode within a browser. In accordance with the inventive arrangements disclosed within this specification, one or more mechanisms for activating a private browsing mode within a browser can be exposed to developers. The private browsing mode can be activated within the browser responsive to one or more conditions that can be detected within various objects typically processed by the browser. As such, private browsing mode can be activated, at least in some cases, automatically without user intervention. For example, the user of the browser need not explicitly request activation of the private browsing mode.

Private browsing mode refers to a mode of operation of a browser. In general, private browsing mode is activated for a particular view of a browser. As used within this specification, the term "view" refers to a region displayed as part of a user interface, e.g., a graphical user interface, of a computer program such as a browser within which an electronic document is rendered. A view, for example, can be implemented as a tab of a browser or a window of a browser. As such, private browsing mode can be activated on a per view basis.

While private browsing mode is activated for a particular view of the browser, the browser does not perform one or more functions that would otherwise be performed were the browser operating in normal browsing mode, e.g., with private browsing mode deactivated. For instance, in normal browsing mode, a browser typically maintains a historical record, stored within the computing system executing the browser, of one or more user activities conducted within a particular view of the browser or conducted in any view in which private browsing mode is deactivated.

Examples of the types of user activities for which a browser maintains a historical record in normal browsing mode can include, but are not limited to, electronic documents that are retrieved, searches that are performed, and files that are downloaded. By comparison, the browser does not maintain a historical record of electronic documents that are retrieved, of searches that are performed, or of files that are downloaded via any view of the browser in which private browsing mode is activated.

Another part of the historical record maintained while in normal browsing mode can include files, such as cookies, that are received by the browser. The files are persisted after the browser session ends, e.g., after the browser stops execution or a particular view of the browser is closed. By comparison, files such as cookies can be deleted responsive to a user input requesting termination of browser execution (e.g., exiting or closing the browser) or the termination of a view in which private browsing mode is activated (e.g., exiting or closing a view).

Another part of the historical record maintained while in normal browsing mode can include bookmarks that are created or changes to personal settings. Any bookmarks created through a view in which private browsing mode is activated can be deleted responsive to a user input requesting termination of browser execution or termination of the view in which private browsing mode is activated. Similarly, changes to settings that are made in a view of the browser while in private browsing mode can be undone or placed into the state that existed prior to activation of private browsing mode responsive to the various conditions described above.

The exemplary user activities described are provided for purposes of illustration only. As such, the examples are not intended to be limiting of the embodiments disclosed within this specification or of the historical record that can be maintained by a browser. Activation of private browsing mode can include the disablement of one or more or all of the operations described relating to maintaining a historical record and/or disablement of other operations, e.g., user activity tracking operations, that would otherwise be performed in normal browsing mode.

FIG. 1 is a block diagram illustrating a communication system 100 in accordance with one embodiment disclosed within this specification. As pictured, communication system 100 can include a data processing system (system) 105 coupled to a server 130 via a network 125.

System 105, being a data processing system, can execute suitable program code, e.g., an operating system (not shown) and a browser 110. Browser 110 can be implemented as a computer program that, when executed, configures system 105 to perform operations including, but not limited to, requesting data from server 130, retrieving data from server 130, and displaying data received from server 130. In general, system 105 can be configured as a client computing system communicatively linked with server 130 via network 125.

Network 125 can represent any of a variety of communication networks or a combination of two or more communication networks. For example, network 125 can be implemented as, or include, a Wide Area Network, a local area network, a wireless network, a mobile network, the Internet, or various combinations thereof.

Server 130 can be implemented as a data processing system or as a group of two or more interconnected data processing systems that store information. Server 130 can be configured to provide data stored therein to one or more other systems, e.g., system 105, responsive to a request for information from the system.

In operation, system 105, while executing browser 110, can send a request 135 to server 130 via network 125. Request 135 can specify one or more electronic documents to be retrieved from server 130, whether directly specified in the form of a requested Universal Resource Identifier (URI), indirectly specified in the form of a search query, or the like. Responsive to request 135, server 130 can send a response in the form of an electronic document 140 to system 105 via network 125.

An electronic document refers to a file, or files, that can be rendered within a browser. One example of electronic document 140 can include, but is not limited to, a page, e.g., a Web Page. Other examples of electronic documents can include, but are not limited to, word processing documents, spreadsheet documents, images, video, audio, or any other content that can be accessed over network 125. Typically, electronic document 140 is accessed by browser 110 using a URI. In any case, electronic document 140 can be associated with a private browsing mode (PBM) indicator 145 as illustrated in FIG. 1. PBM indicator 145 is correlated with a private browsing mode of browser 110.

PBM indicator 145 can be an identifier that is associated with electronic document 140. In one aspect, PBM indicator 145 can be located, or included, within electronic document 140. In another aspect, PBM indicator 145 can be formed of one or more portions of the URI for electronic document 140. In another aspect, PBM indicator 145 can be an attribute associated with electronic document 140 such as a link attribute for a hyperlink referencing electronic document 140. In any case, responsive to browser 110 identifying PBM indicator 145 in association with electronic document 140, browser 110 can open electronic document 140 in a view in which private browsing mode is activated.

Figure 2:
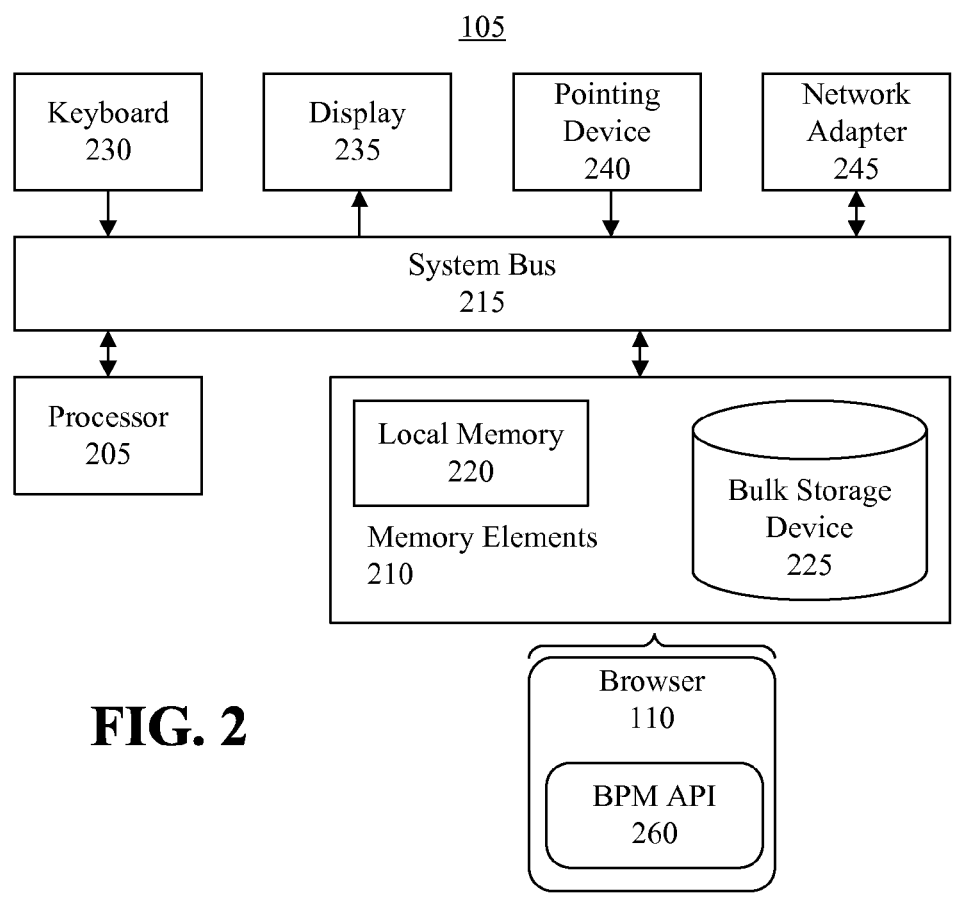
FIG. 2 is a block diagram illustrating an exemplary implementation of a system in accordance with another embodiment disclosed within this specification.

FIG. 2 is a block diagram illustrating an exemplary implementation of system 105 in accordance with another embodiment disclosed within this specification. Like numbers will be used to refer to the same items throughout this specification. System 105 can include at least one processor 205 coupled to memory elements 210 through a system bus 215 or other suitable circuitry. As such, system 105 can store program code within memory elements 210. Processor 205 can execute the program code accessed from memory elements 210 via system bus 215. In one aspect, for example, system 105 can be implemented as a computer that is suitable for storing and/or executing program code. It should be appreciated, however, that system 105 can be implemented in the form of any system including a processor and memory that is capable of performing the functions and/or operations described within this specification.

Memory elements 210 can include one or more physical memory devices such as, for example, local memory 220 and one or more bulk storage devices 225. Local memory 220 refers to random access memory (RAM) or other non-persistent memory device(s) generally used during actual execution of the program code. Bulk storage device(s) 225 can be implemented as a hard disk drive (HDD), a solid state drive (SSD), or another persistent data storage device. System 105 also can include one or more cache memories (not shown) that provide temporary storage of at least some program code in order to reduce the number of times program code must be retrieved from bulk storage device 225 during execution.

Input/output (I/O) devices such as a keyboard 230, a display 235, and a pointing device 240 optionally can be coupled to system 105. The I/O devices can be coupled to system 105 either directly or through intervening I/O controllers. One or more network adapters 245 also can be coupled to system 105 to enable system 105 to become coupled to other systems, computer systems, remote printers, and/or remote storage devices through intervening private or public networks. Modems, cable modems, and Ethernet cards are examples of different types of network adapters 245 that can be used with system 105.

As pictured in FIG. 2, memory elements 210 can store browser 110. Browser 110, being implemented in the form of executable program code, can be executed by system 105 and, as such, can be considered part of system 105. In general, browser 110 can be configured to detect and/or identify a PBM indicator within data received from a server. In response to detecting the PBM indicator, browser 110 can activate private browsing mode available within browser 110 for rendering the data or other data not yet received within a view presented upon display 235. The term "render," within this specification, can refer to executing an electronic document, interpreting an electronic document (e.g., interpreting markup language or a script), displaying an electronic document, or playing an electronic document such as audio and/or video.

In one aspect, browser 110 can include the functionality described within this specification for detecting PBM indicator 145 as part of the native infrastructure or architecture of browser 110. In another aspect, browser 110 can include a PBM application programming interface (API) 260 that can be accessed by developers of electronic documents that can be rendered by browser 110.

For example, PBM API 260 can be made available to, and accessed by, an extension (not shown) that is installed within browser 110. PBM API 260 can provide one or more functions that can be accessed or invoked by the extension in order to activate private browsing mode for retrieved electronic documents as described in further detail within this specification.

Figure 3:
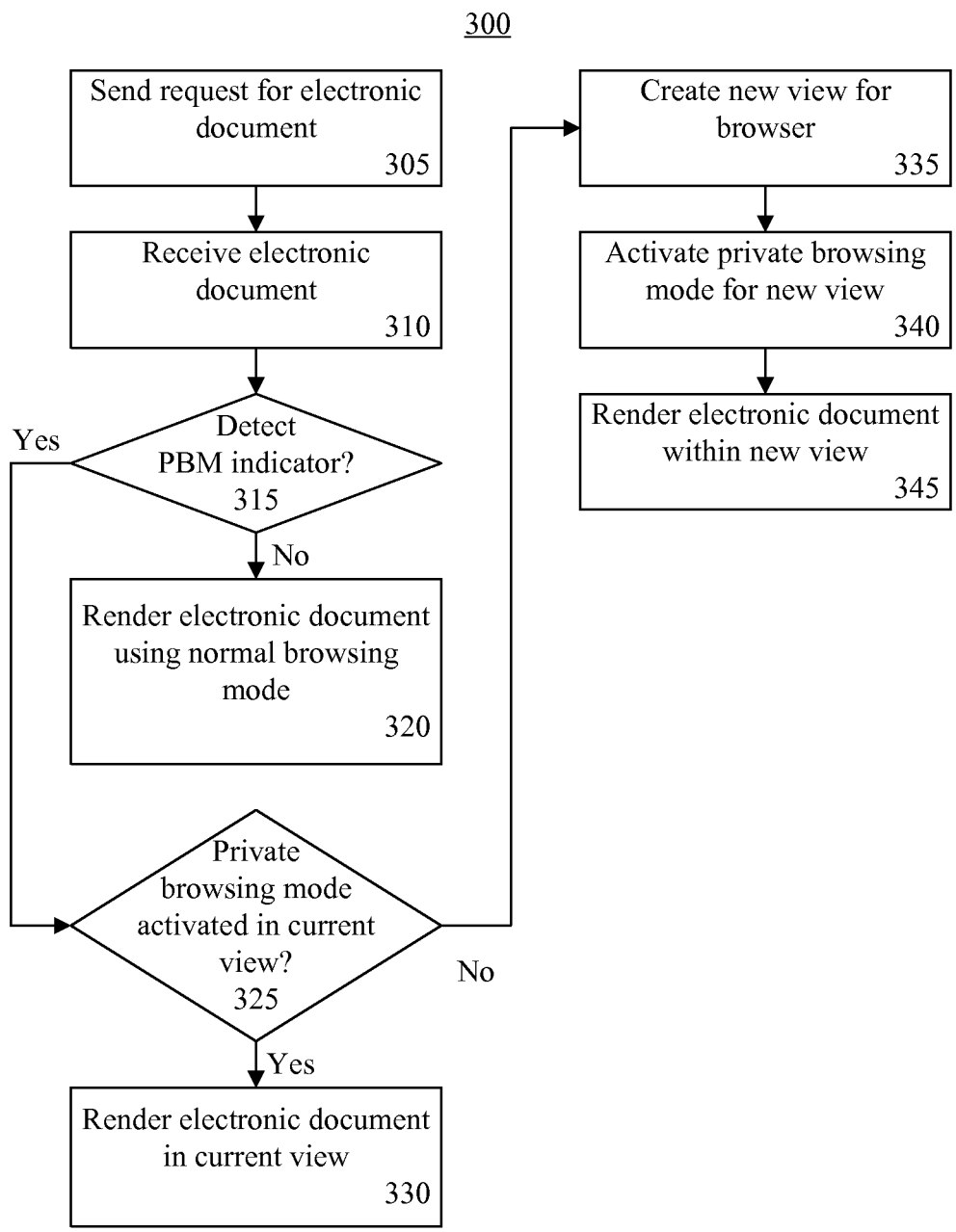
FIG. 3 is a flow chart illustrating a method of activating private browsing mode in accordance with another embodiment disclosed within this specification.

FIG. 3 is a flow chart illustrating a method 300 of activating private browsing mode in accordance with another embodiment disclosed within this specification. Method 300 can be performed by system 105 as described with reference to FIGS. 1 and 2 of this specification.

In block 305, the system can send a request for an electronic document to a server. In one aspect, the request can be sent in consequence of a received user input requesting an electronic document, such as the selection of a hyperlink referencing the electronic document. For example, the request for the electronic document can originate from a currently open or active view of the browser in which the hyperlink is selected. In another aspect, the request can be sent in consequence of an automated feature of the browser in which one or more electronic documents are retrieved by the system. In block 310, the system can receive the electronic document specified by the request in block 305.

In block 315, the system can determine whether the electronic document includes a PBM indicator. In one aspect, the system can parse, e.g., search, the electronic document to determine whether the electronic document includes a PBM indicator. In illustration, the electronic document can include markup language such as HyperText Markup Language (HTML) or the like. The system can detect an attribute or tag within the electronic document indicating that the electronic document is to be opened in a view of the browser in which private browsing mode is activated. For example, the PBM indicator can be an HTML attribute or tag located in the header portion of the electronic document.

In another aspect, the PBM indicator can be specified as, or included within, e.g., be part of, the URI of the electronic document. The browser can be configured to detect electronic documents having a URI that matches predetermined criteria correlated with private browsing mode.

In one aspect, an extension can be installed within the browser that is configured to open particular electronic documents using private browsing mode. The extension can be configured to maintain a list of items, e.g., private browsing mode criteria, such as URIs or patterns within URIs, e.g., portions of URIs. An electronic document having a URI, or any portion of a URI such as a hierarchical part or a query part, that matches the private browsing mode criteria, e.g., an item on the list, can be considered by the extension to include a PBM indicator. For example, the URI can be evaluated when the request is sent by the browser.

Responsive to determining that the electronic document does not include a PBM indicator, method 300 can continue to block 320. In block 320, the system can render the electronic document using normal browsing mode. The electronic document can be rendered in a new view or in the current view of the browser.

Responsive to determining that the electronic document does include a PBM indicator, method 300 can continue to block 325. In block 325, the system can determine whether private browsing mode is already activated in the current view of the browser. Responsive to determining that private browsing mode is already activated in the current view of the browser, method 300 can proceed to block 330. In block 330, the system can render the electronic document in the current view. Responsive to determining that private browsing mode is not activated in the current view of the browser, method 300 can continue to block 335.

In block 335, the system can create, e.g., open, a new view for the browser. In block 340, the system can activate private browsing mode for the new view. It should be appreciated that while blocks 335 and 340 are illustrated as being separate blocks, activation of private browsing mode can be performed concurrently with the creation of the new view. In any case, in block 345, the electronic document can be rendered within the new view. Blocks 335-345 can be performed automatically by the system without user intervention.

In another aspect, the system can be configured to delete historical data for the electronic document. As discussed, while in normal browsing mode, a historical record of user activities is routinely stored. Accordingly, in one aspect, any data relating to the retrieval of the electronic document of block 310 can be deleted from the system. Responsive to activation of private browsing mode, e.g., immediately responsive to activation of private browsing mode or at a time thereafter such as responsive to closing the view in which the electronic document is rendered in block 345, the system can delete any record of the request issued in block 305 and/or the receipt of the electronic document in block 310. Any other historical data relating to the electronic document also can be deleted.

Once private browsing mode is activated, historical data is not persisted. The deletion process described facilitates the purging of data that can be collected for an electronic document while the system still is in normal browsing mode prior to activation of private browsing mode. For example, in order to determine whether the electronic document includes a PBM indicator, the electronic document still may be processed and, in some cases, rendered within a view of the browser. In the example illustrated in FIG. 3, data collected as part of the historical record for the electronic document while in normal browsing mode can be deleted if the electronic document is opened in private browsing mode. Further, any view of the browser in which private browsing mode is deactivated and the electronic document may have been displayed prior to the creation of the new view as described with reference to block 335 can be closed.

Figure 4:
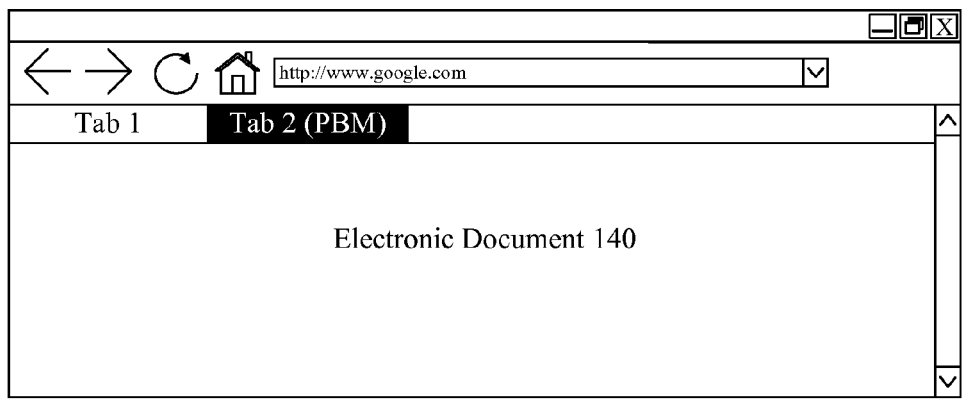
FIG. 4 is a block diagram illustrating an exemplary view of a browser in accordance with another embodiment disclosed within this specification.

FIG. 4 is a block diagram illustrating an exemplary view 400 of browser 110 in accordance with another embodiment disclosed within this specification. FIG. 4 illustrates a scenario in which browser 110, while executing within system 105, has received electronic document 140. For purposes of discussion and illustration, it can be assumed that the request for electronic document 140 originated from Tab 1, which was open as the current view of browser 110 prior to receiving electronic document 140, and that private browsing mode is not activated in Tab 1. For example, a hyperlink to electronic document 140 can be presented within Tab 1 and selected via a user input.

In the example illustrated in FIG. 4, browser 110 has received electronic document 140 and detected PBM indicator 145 associated with electronic document 140. In response to processing electronic document 140, browser 110 has created Tab 2 and rendered electronic document 140 within Tab 2. As shown, Tab 2 is the active tab. Further, private browsing mode is activated for Tab 2 as indicated by the "PBM" acronym in parenthesis in Tab 2.

Figure 5:
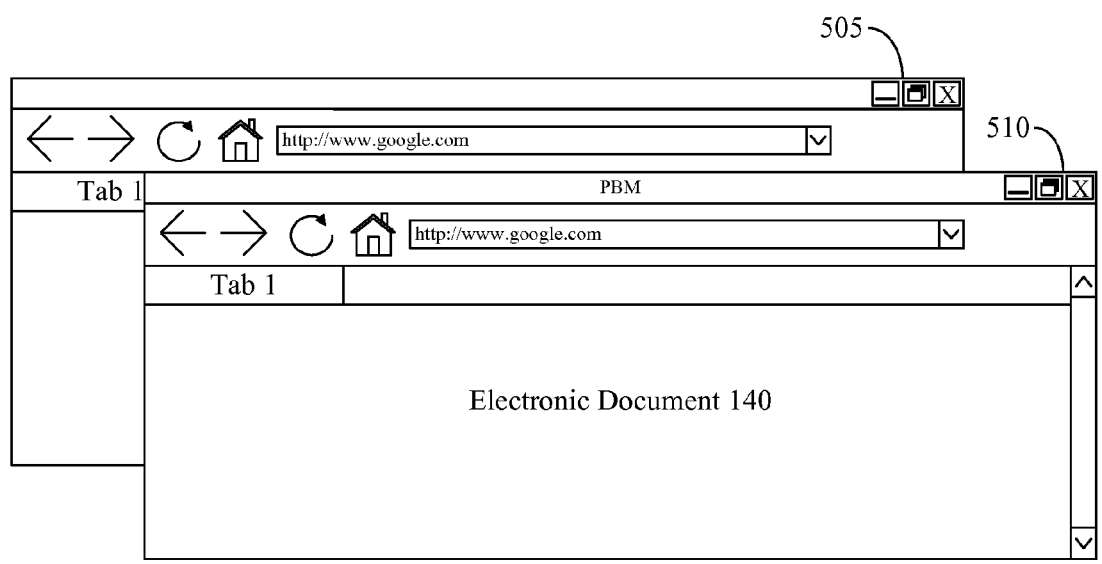
FIG. 5 is a block diagram illustrating exemplary views of a browser in accordance with another embodiment disclosed within this specification.

FIG. 5 is a block diagram illustrating exemplary views 505 and 510 of browser 110 in accordance with another embodiment disclosed within this specification. FIG. 5 illustrates a scenario in which browser 110, while executing within system 105, has received electronic document 140. For purposes of discussion and illustration, it can be assumed that the request for electronic document 140 originated from window 505, which was open as the current view of browser 110 prior to receiving electronic document 140, and that private browsing mode is not activated in window 505. For example, a hyperlink to electronic document 140 can be presented within window 505 and selected via a user input.

In the example illustrated in FIG. 5, browser 110 has received electronic document 140 and detected PBM indicator 145 associated with electronic document 140. In response to processing electronic document 140, browser 110 has created window 510 and rendered electronic document 140 within window 510. As shown, private browsing mode is activated for window 510 as indicated by the "PBM" acronym in the title portion of window 510.

Figure 6:
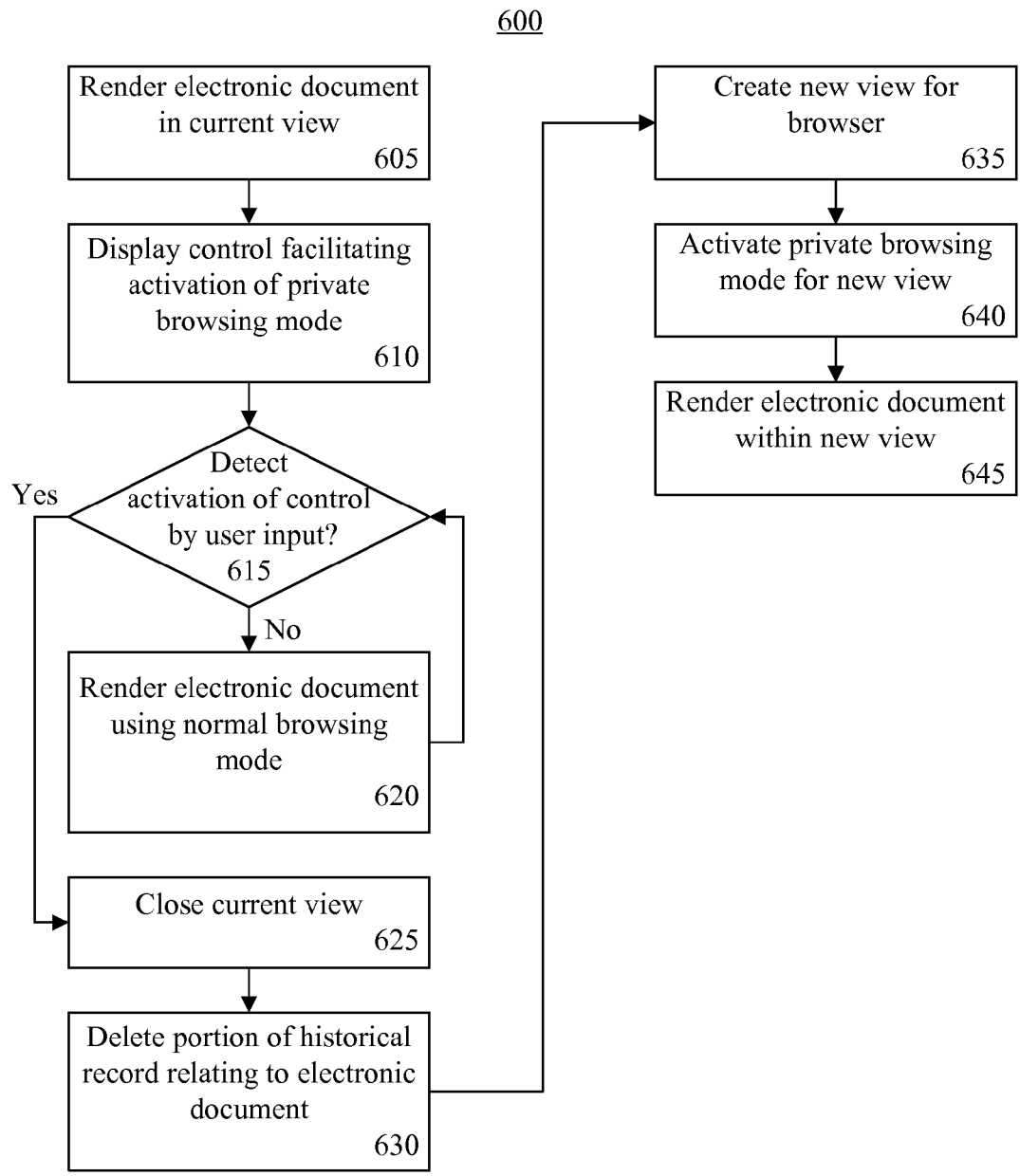
FIG. 6 is a flow chart illustrating a method of activating private browsing mode in accordance with another embodiment disclosed within this specification.

FIG. 6 is a flow chart illustrating a method 600 of activating private browsing mode in accordance with another embodiment disclosed within this specification. Method 600 can be implemented by a system such as system 105 as described within this specification. Method 600 can begin in a state in which an electronic document is received in response to a request and the system has determined that the electronic document includes a PBM indicator. Further, private browsing mode for the current view of the browser, e.g., the view from which the request for the electronic document originated, is not activated.

Accordingly, method 600 can begin in block 605 where the system can render the electronic document in the current view of the browser. In block 610, the system can display a control facilitating activation of private browsing mode responsive to detecting the PBM indicator associated with the electronic document. The control can be presented as any of a variety of visual elements commonly used within electronic documents such as a hyperlink, a button, a radio button, or the like.

In one example, the system can insert program code, e.g., markup language or the like, into the electronic document after retrieval that, when rendered by the system, causes the control to be displayed as part of the electronic document. In another example, the system can present the control, e.g., a button, within an information bar across a portion of the viewable area of the current view in which the electronic document is rendered. The control can be presented using any of a variety of different interface techniques known to those skilled in the art. The examples presented are for purposes of illustration and, as such, are not intended as limitations of the embodiments disclosed within this specification.

In block 615, the system can determine whether the control has been selected or activated via a user input. Responsive to determining that the control has not been activated, method 600 can continue to block 620, where the electronic document can continue to be rendered in the current view of the browser in normal browsing mode. As illustrated, method 600 can continue to loop back to block 615 to detect when, or if, a user input is received that activates the control.

Responsive to determining that the control has been activated, method 600 can proceed to block 625. In block 625, the system can close the current view of the browser in which the electronic document has been rendered. In block 630, the system can delete any portion of the historical record relating to the electronic document as opened within the view of the browser closed in block 625. In block 635, the system can create a new view, e.g., a window or a tab. In block 640, the system can activate private browsing mode for the new view. As noted, blocks 635 and 640 can be performed concurrently. In block 645, the system can render the electronic document within the new view.

FIG. 6 illustrates an example in which the browser, or an extension installed within the browser, can be configured to detect the PBM indicator and display the control for initiating private browsing mode. In another embodiment, however, the electronic document can include program code, e.g., markup language, that is configured to access the PBM API of the browser and conditionally present the control.

The electronic document, when rendered by the browser, can call a function via the PBM API to determine whether private browsing mode is activated in the current view. The function of the PBM API can return a result indicating whether private browsing mode is activated for the current view in which the electronic document is rendered. When private browsing mode is not activated, based upon the result returned by the function, the electronic document can display the control which can be specified within, or as part of, the electronic document. In this manner, the location and/or type of control that is presented can be dictated by the electronic document rather than the browser. Correspondingly, when private browsing mode is activated for the current view, the electronic document can be displayed without the control.

In another aspect, with various electronic documents having the ability to indicate that private browsing mode should be invoked to view the electronic document, search results can be presented within an electronic document in which those results to be opened in private browsing mode are distinguished from those results not to be opened in private browsing mode.

Figure 7:
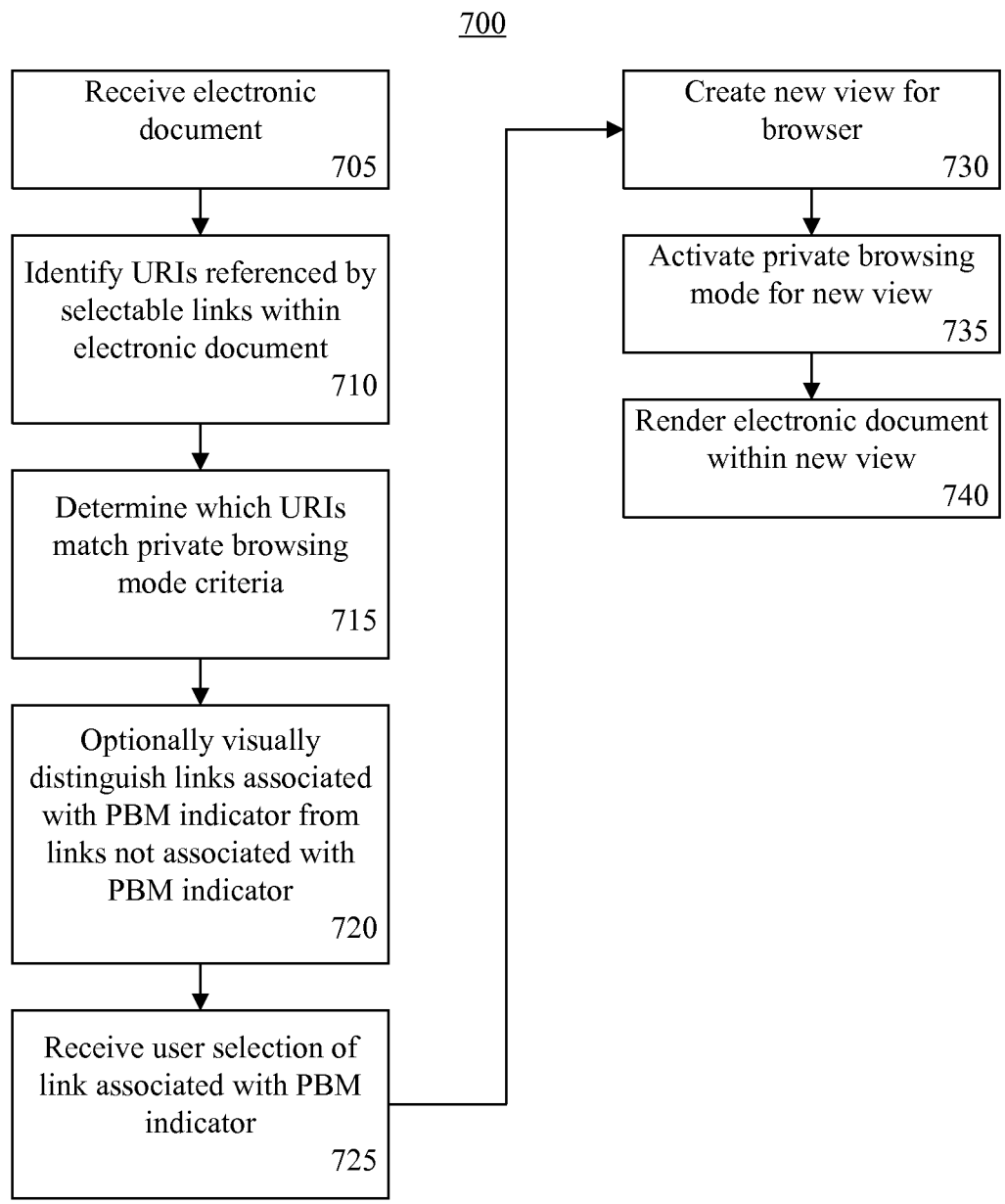
FIG. 7 is a flow chart illustrating a method of activating private browsing mode in accordance with another embodiment disclosed within this specification.

FIG. 7 is a flow chart illustrating a method 700 of activating private browsing mode in accordance with another embodiment disclosed within this specification. Method 700 can be implemented by system 105 as described within this specification. Method 700 illustrates an example in which an extension is installed within the browser that is configured to identify particular electronic documents that should be opened using private browsing mode.

Method 700 can begin in bock 705 where an electronic document can be received. For example, the electronic document can include search results received in response to a query or search. In block 710, the system can identify URIs referenced by selectable links, e.g., hyperlinks, within the electronic document. In block 715, the system can determine which of the URIs match private browsing mode criteria stored as part of the extension. As discussed, the extension can maintain a list of items such as URIs and/or patterns (e.g., portions) of URIs. When a link within the electronic document specifies a URI matching an item in the list, the link, and the electronic document referenced by the link, can be said to be associated with a PBM indicator.

In block 720, the system optionally can modify the electronic document. In one aspect, the system can modify the electronic document to visually distinguish links in the electronic document that are associated with a PBM indicator from links in the electronic document that are not associated with a PBM indicator. The system can rewrite the electronic document to include program code adding a visualization technique to the links to be distinguished such as different coloring, underlining, placing an additional control proximate to the link, etc.

In another aspect, those links determined to be associated with a PBM indicator can be rewritten with one or more attributes that, when interpreted by the browser, force the browser to open the electronic document referenced by the link in a new view in which private browsing mode is activated. For example, the link can be rewritten to include a link attribute such as "target=private_browsing" or include another directive that is inserted into the URI that is understandable by the browser. In another example, when a control is added, selection of the control can cause the browser to open the electronic document associated with the control in a new view in which private browsing mode is activated.

In block 725, the system can render the electronic document within a currently open view. For purposes of discussion, it can be assumed that private browsing mode is not activated in the current view in which the search results are presented.

In block 730, a user selection of a link associated with a PBM indicator can be received by the system. In step 735, the system can create a new view for the browser. In block 740, private browsing mode can be activated in the new view. In block 745, the electronic document referenced by the selected link can be rendered within the new view. As noted, blocks 735-740 can be performed concurrently.

Figure 8:
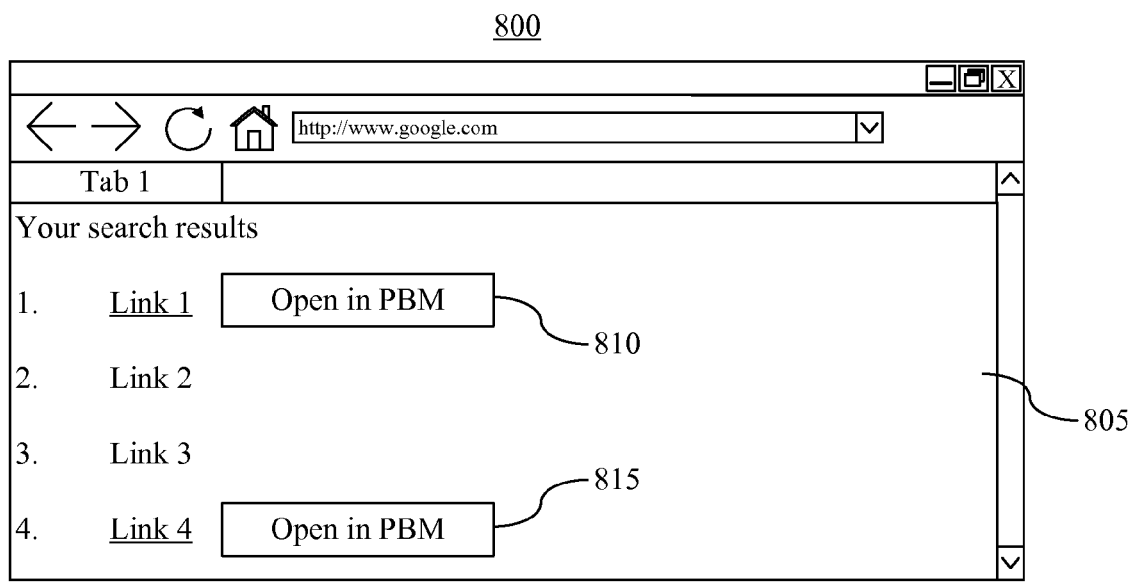
FIG. 8 is a block diagram illustrating an exemplary view of a browser in accordance with another embodiment disclosed within this specification.

FIG. 8 is a block diagram illustrating an exemplary view 800 of browser 110 in accordance with another embodiment disclosed within this specification. For purposes of discussion, browser 110, executing within system 105, can include an installed extension. The extension can be configured to identify particular URIs within an electronic document largely as described with reference to FIG. 7.

In the example presented in FIG. 8, an electronic document 805 is rendered within view 800. Electronic document 805 presents a list of links, e.g., search results, located responsive to a search or query. Each of links 1-4 can reference, or specify, a corresponding URI for an electronic document that can be opened responsive to a selection of the link. The extension has compared each of the URIs corresponding to links 1-4 to the list of items, e.g., the private browsing mode criteria, and determined that link 1 and link 4 each match at least one item on the list. As such, link 1 and link 4 can be said to include, or be associated with, a PBM indicator. Accordingly, the extension alters the electronic document so that link 1 and link 4 are visually distinguished from link 2 and link 3. In this example, underlining is used as the mechanism for visually distinguishing links, though any of a variety of different techniques can be used.

As noted, another technique for visually distinguishing one link from another can include displaying an additional indicator or control such as control 810 or control 815 proximate to the link to be distinguished. Referring to FIG. 8, control 810 is displayed immediately next to link 1, or within a predetermined distance of link 1 within view 800 in order to demonstrate an association with link 1. Similarly, control 815 is displayed immediately next to link 4, or within a predetermined distance of link 4 within view 800 in order to demonstrate an association with link 4.

Responsive to a user input selecting control 810, the system can create a new view in which private browsing mode is activated and the electronic document referenced by link 1 is retrieved and rendered. Similarly, responsive to a user input selecting control 815, the system can create a new view in which private browsing mode is activated and the electronic document referenced by link 4 is retrieved and rendered. By maintaining a list of criteria for URIs that can be considered PBM indicators, a developer can determine that an entire class of electronic documents from a particular Website is to be opened using private browsing mode.

The embodiments disclosed within this specification allow developers to activate private browsing mode or to at least suggest using private browsing mode for electronic documents accessed via a browser within a computing system. Thus, rather than restricting activation of private browsing mode to end-users, activation of private browsing mode can be facilitated by way of the browser itself in response to detecting particular PBM indicators associated with electronic documents by developers.

For purposes of explanation, specific nomenclature is set forth to provide a thorough understanding of the various inventive concepts disclosed herein. The terminology used herein, however, is for the purpose of describing particular embodiments only and is not intended to be limiting. For example, reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The terms "a" and "an," as used herein, are defined as one or more than one. The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

The term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

One or more embodiments can be realized in hardware or a combination of hardware and software. One or more embodiments can be realized in a centralized fashion in one system or in a distributed fashion where different elements are spread across several interconnected systems. Any kind of data processing system or other apparatus adapted for carrying out at least a portion of the methods described herein is suited.

One or more embodiments further can be implemented in the form of a computer program product, which includes all the features enabling the implementation of the methods described herein. The computer program product can include a data storage medium, e.g., a non-transitory computer-usable or computer-readable storage medium, storing program code that, when executed in a system including a processor, causes the system to perform at least a portion of the functions described within this specification. Examples of data storage media can include, but are not limited to, optical media, magnetic media, magneto-optical media, computer memory such as RAM, a bulk storage device, e.g., hard disk, or the like.

Accordingly, the flowchart and block diagrams in the Figures illustrate the architecture, functionality, and operation of possible implementations of systems, methods and computer program products according to various embodiments disclosed herein. In this regard, each block in the flowchart or block diagrams may represent a module, segment, or portion of code, which includes one or more executable instructions for implementing the specified logical function(s). It should also be noted that, in some alternative implementations, the functions noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terms "computer program," "software," "application," "computer-usable program code," "program code," "executable code," variants and/or combinations thereof, in the present context, mean any expression, in any language, code or notation, of a set of instructions intended to cause a system having an information processing capability to perform a particular function either directly or after either or both of the following: a) conversion to another language, code, or notation; b) reproduction in a different material form. For example, program code can include, but is not limited to, a subroutine, a function, a procedure, an object method, an object implementation, an executable application, an applet, a servlet, source code, object code, markup language, an extension, a shared library/dynamic load library and/or other sequence of instructions designed for execution on a computer system.

Thus, throughout this specification, statements utilizing terms such as "processing," "computing," "calculating," "determining," "displaying," or the like, refer to the action and processes of a data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

The corresponding structures, materials, acts, and equivalents of all means or step plus function elements in the claims below are intended to include any structure, material, or act for performing the function in combination with other claimed elements as specifically claimed.

One or more embodiments disclosed within this specification can be embodied in other forms without departing from the spirit or essential attributes thereof. Accordingly, reference should be made to the following claims, rather than to the foregoing specification, as indicating the scope of the one or more embodiments.

What is claimed is:

1. A method, comprising:
   receiving an electronic document within a browser;
   detecting, using a processor, an indicator associated with the electronic document, the indicator indicating whether or not the electronic document should be rendered in a private browsing mode of the browser; and
   when the indicator indicates that the electronic document should be rendered in the private browsing mode of the browser:
   determining, using the processor, whether the private browsing mode is activated within a current browser tab of the browser in which the electronic document-is-rendered;
   when the private browsing mode is not activated within the current browser tab in which the electronic document is rendered, presenting a visual control element within the current browser tab in which the electronic document is rendered, wherein the visual control element is selectable by user input to activate the private browsing mode for a new browser tab to render the electronic document; and
   responsive to detecting a selection of the visual control element by a user input, creating the new browser tab in which the private browsing mode is activated and rendering the electronic document within the new browser tab.

2. The method of claim 1, wherein the indicator is at least a portion of a universal resource identifier of the electronic document.

3. The method of claim 1, wherein the indicator is located within the electronic document.

4. The method of claim 1, further comprising:
   responsive to the user input selecting the visual control element, closing the current browser tab.

5. The method of claim 1, further comprising:
   deleting historical data for the electronic document responsive to activation of private browsing mode.

6. A method, comprising:
   determining, using a processor, whether a first link displayed within an electronic document rendered in browser tab of a browser is associated with an indicator indicating that a different electronic document specified by the first link should be rendered in a private browsing mode of the browser;

responsive to determining that the first link is associated with the indicator, visually distinguishing the first link from a second link that is not associated with the indicator within the electronic document as rendered within the browser tab by the browser; and adding a visual control indicator associated with the first link that, when selected by a user, creates a new browser tab of the browser in which private browsing mode is enabled and within which the different electronic document specified by the first link is rendered.

7. The method of claim 6, further comprising:

adding an attribute to the first link that, when selected, creates a new browser tab of the browser in which private browsing mode is enabled and within which a different electronic document specified by the first link is rendered.

8. The method of claim 6, further comprising:

responsive to a user selection of the first link associated with the indicator, creating a new browser tab of the browser in which the private browsing mode is enabled and rendering a different electronic document specified by the first link within the new browser tab.

9. A system comprising:

a processor configured to invoke executable operations comprising:

receiving an electronic document within a browser;

determining whether the private browsing mode is activated within a current browser tab in which the electronic document is rendered;

detecting, using the processor, an indicator associated with-the electronic document-the indicator indicating whether or not the electronic document should be rendered in a private browsing mode of the browser; and when the indicator indicates that the electronic document should be rendered in the private browsing mode of the browser:

determining, using the processor, whether the private browsing mode is activated within a current browser tab of the browser in which the electronic document-is-rendered;

when the private browsing mode is not activated within the current browser tab in which the electronic document is rendered, presenting a visual control element within the current browser tab in which the electronic document is rendered, wherein the visual control element is selectable by user input to activate the private browsing mode for a new browser tab to render the electronic document; and responsive to detecting a selection of the visual control element by a user input, creating a new browser tab in which the private browsing mode is activated and rendering the electronic document within the new browser tab.

10. The system of claim 9, wherein the indicator is at least a portion of a universal resource identifier of the electronic document.

11. The system of claim 9, wherein the indicator is located within the electronic document.

12. The system of claim 9, wherein the processor is further configured to initiate an executable operation comprising:

deleting historical data for the electronic document responsive to activation of the private browsing mode.

13. A non-transitory computer program product, comprising:

a computer readable storage medium having stored thereon program code that, when executed, configures a processor to perform operations comprising:

receiving an electronic document within a browser;

detecting, using a processor, an indicator associated with the electronic document, the indicator indicating whether or not the electronic document should be rendered in a private browsing mode of the browser; and when the indicator indicates that the electronic document should be rendered in the private browsing mode of the browser:

determining, using the processor, whether the private browsing mode is activated within a current browser tab of the browser in which the electronic document is rendered;

when the private browsing mode is not activated within the current browser tab in which the electronic document is rendered, presenting a visual control element within the browser tab in which the electronic document is rendered, wherein the visual control element is selectable by user input to activate the private browsing mode for a new browser tab to render the electronic document; and responsive to detecting a selection of the visual control element by a user input, creating the new browser tab in which the private browsing mode is activated and rendering the electronic document within the new browser tab.

14. The computer program product of claim 13, wherein the indicator is at least a portion of a universal resource identifier of the electronic document.

15. The computer program product of claim 13, wherein the indicator is located within the electronic document.

16. The computer program product of claim 13, wherein the computer readable storage medium further has stored thereon program code that, when executed, configures the processor to perform operations comprising:

responsive to the user input selecting the visual control element, closing the current browser tab.

17. The computer program product of claim 13, wherein the computer readable storage medium further has stored thereon program code that, when executed, configures the processor to perform operations comprising:

deleting historical data for the electronic document responsive to activation of private browsing mode.

* * * * *